(12) United States Patent
Liebl et al.

(10) Patent No.: US 7,384,371 B2
(45) Date of Patent: Jun. 10, 2008

(54) DRIVE UNIT FOR A MOTOR VEHICLE HAVING A HYBRID DRIVE

(75) Inventors: Johannes Liebl, Moosburg (DE); Michael Bertram, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/724,185

(22) Filed: Mar. 15, 2007

(65) Prior Publication Data

US 2007/0167281 A1    Jul. 19, 2007

Related U.S. Application Data

(63) Continuation of application No. PCT/EP2005/008924, filed on Aug. 17, 2005.

(30) Foreign Application Priority Data

Sep. 17, 2004 (DE) .................. 10 2004 045 269

(51) Int. Cl.
*B60K 1/02* (2006.01)
(52) U.S. Cl. .................................. 477/3; 903/945
(58) Field of Classification Search .............. 477/3, 477/15, 97; 903/945
See application file for complete search history.

(56) References Cited

U.S. PATENT DOCUMENTS

| | | | |
|---|---|---|---|
| 5,327,992 A | | 7/1994 | Boll |
| 6,428,444 B1* | | 8/2002 | Tabata ........................ 477/3 |
| 6,459,980 B1* | | 10/2002 | Tabata et al. .................. 701/70 |
| 6,524,221 B2* | | 2/2003 | Nishimura .................... 477/97 |
| 6,595,895 B2* | | 7/2003 | Suzuki et al. .................. 477/3 |
| 2003/0114269 A1* | | 6/2003 | Grassl et al. ................... 477/3 |
| 2004/0001314 A1* | | 1/2004 | Bitsche et al. ............... 361/688 |
| 2004/0029678 A1 | | 2/2004 | Kayukawa et al. |
| 2005/0071065 A1 | | 3/2005 | Zimmermann et al. |
| 2006/0293144 A1* | | 12/2006 | Nishina et al. ................. 477/5 |

FOREIGN PATENT DOCUMENTS

| | | |
|---|---|---|
| DE | 42 17 668 C1 | 5/1993 |
| DE | 102 30 612 A1 | 2/1997 |
| DE | 100 43 724 A1 | 3/2001 |
| EP | 0 768 204 B1 | 4/2003 |

OTHER PUBLICATIONS

English translation of DE100443724; www.worldlingo.com/we/epo/epo.html; Sep. 20, 2007.*
"Fahrbericht: Tausendsassa" ("Driving Report: An Allaround Winner"), Auto Motor Sport, Edition Nov. 2004, pp. 62-64.
International Search Report dated Nov. 7, 2005 with English translation (Four (4) pages).
German Search Report dated Apr. 18, 2005 with English translation (Six (6) Pages).

* cited by examiner

*Primary Examiner*—Roger Pang
(74) *Attorney, Agent, or Firm*—Crowell & Moring LLP

(57) ABSTRACT

A drive unit for a motor vehicle having a hybrid drive, includes an internal-combustion engine, an electrical rotating machine with a pertaining energy accumulator, a transmission unit, and a control unit. The transmission unit includes at least one starting gear position which can be operated only and exclusively when defined conditions exist during a starting operation from the stationary position of the vehicle. For this purpose, the control unit is constructed such that, as a function of the charge condition of the energy accumulator, the starting operation takes place in a standard gear position of the first ratio, or the starting operation takes place in the starting gear position with a ratio of the transmission unit different from the first ratio.

6 Claims, 1 Drawing Sheet

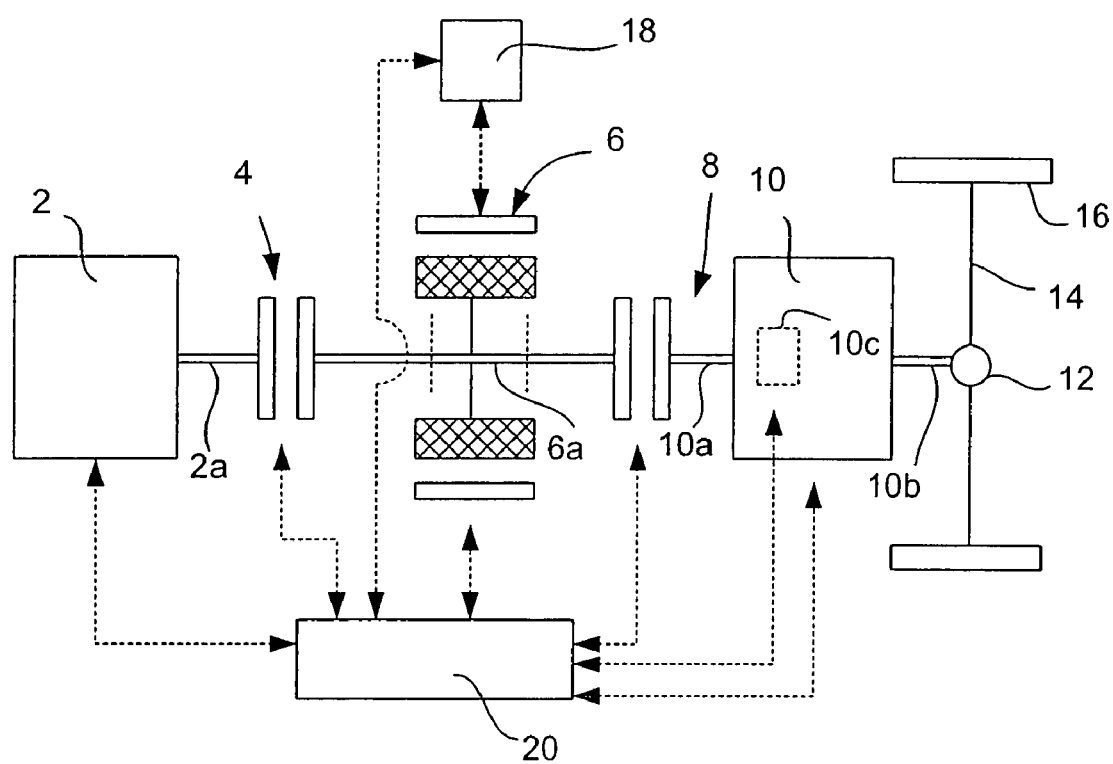

DRIVE UNIT FOR A MOTOR VEHICLE HAVING A HYBRID DRIVE

CROSS-REFERENCE TO RELATED APPLICATIONS

This application is a continuation of PCT International Application No. PCT/EP2005/008924, filed on Aug. 17, 2005, which claims priority under 35 U.S.C. § 119 to German Application No. 10 2004 045 269.5, filed Sep. 17, 2004, the entire disclosures of which are expressly incorporated by reference herein.

BACKGROUND AND SUMMARY OF THE INVENTION

The invention relates to a drive unit for a motor vehicle having a hybrid drive and, more particularly, to a drive unit for a motor vehicle having a hybrid drive, including an internal-combustion engine, an electrical rotating machine with a pertaining energy accumulator, a transmission unit, and a control unit.

Many different hybrid vehicle concepts are known, which have an internal-combustion engine and an electrical rotating machine as drive sources. From the trade journal *Auto Motor Sport*, Edition 11/2004, Page 62, et. seq., "Fahrbericht: Tausendsassa" ("Driving Report: An Allround Winner", a driving report relating to a BMW X5 is known. Here, a vehicle of the above-mentioned type is described which, in a lower rotational speed range of up to approximately 3,500 rpm, accomplishes the drive by a combination of the conventional internal-combustion engine and an electrical rotating machine. By adding up the torques of the two drive assemblies, a torque of 1,000 Nm is already provided here in the lower rotational speed range at 1,000 rpm. Only when 3,500 rpm have been reached, will the electrical rotating machine be uncoupled from the transmission line, and the drive is implemented in the conventionally known manner by way of the internal-combustion engine exclusively. However, it is contemplated in the case of such systems that, in the event of identical driver intentions or load demands at points in time with a clearly different charging condition of the energy accumulator, a different (not reliably reproducible) starting torque is available to the driver.

It is an object of the invention to indicate a drive unit for a hybrid motor vehicle which, if possible, always provides an identical starting torque, irrespective of the charge condition of the energy accumulator for the electric drive.

According to the invention, this object is achieved by a drive unit for a motor vehicle having a hybrid drive, including an internal-combustion engine, an electrical rotating machine with a pertaining energy accumulator, a transmission unit, and a control unit. The transmission unit includes at least one starting gear position. The control unit is constructed such that, as a function of a charge condition of the energy accumulator, above a defined charge threshold, the starting operation takes place in a standard gear position and, in an event of a charge condition below the defined charge threshold, the starting operation takes place in the starting gear position. The starting gear position has a shorter ratio than the smallest standard gear position.

By constantly monitoring the charge condition of the energy accumulator for the motor drive of the electrical rotating machine and adjusting the transmission ratio as a function thereof for generating the driving torque acting upon the driving wheels, the same driving torque is always provided almost independently of the charge condition of the energy accumulator while the load demand is identical.

The energy accumulator for the electrical rotating machine, which is present in addition to a conventional starter battery and is, preferably, constructed as a capacitor arrangement, is monitored with respect to a charge threshold. Should there be a falling below this defined charge threshold, and in the event of an existing current charge condition, a corresponding load demand be present which cannot be met, for example, only by the internal-combustion engine, the transmission unit will be set to a lower gear ratio by way of a control unit, by way of which gear ratio the corresponding load demand (demanded load moment) can be met.

For this purpose, the transmission unit according to the invention has at least one additional gear position which is activated exclusively when the charge condition falls below the predefined charge threshold and exclusively during the starting operation. As an alternative to an additional gear position in the conventional transmission unit, it is also contemplated to provide a separate front-mounted auxiliary transmission with a corresponding ratio and triggering possibility. Particularly, the functionality of an continuously variable front-mounted auxiliary transmission would meet the demands for providing a constantly identical starting torque for the same load demands. With respect to the invention, it is only essential that, as a function of the charge condition of the energy accumulator, the starting operation takes place in a standard gear position of the first ratio or a starting operation takes place in the starting gear position, the starting ratio being smaller than that of the standard gear position. It is, thereby, achieved that a reproducible starting behavior is ensured for any load demand at any time, irrespective of the charge condition of the energy accumulator.

Other objects, advantages and novel features of the present invention will become apparent from the following detailed description of the invention when considered in conjunction with the accompanying drawings.

BRIEF DESCRIPTION OF THE DRAWING

The single figure shows the transmission line of a hybrid motor vehicle according to the invention.

DETAILED DESCRIPTION OF THE DRAWING

In the transmission line shown in the figure, arranged in series behind one another, is an internal-combustion engine 2 which, by way of its output shaft 2a and a clutch 4, is connected with the drive shaft 6a of an electrical rotating machine 6, which can be operated at least by a motor, as well as a transmission unit 10 by way of whose input shaft 10a the electrical rotating machine 6 is frictionally coupled with its drive shaft 6a via another clutch 8. The two clutches 4, 8 are only optionally arranged in the transmission line. On the output side, the transmission unit 10 acts upon the drive wheels 16 by way of its output shaft 10b, a differential gear 12 and drive axles 14. The power supply of the electrical rotating machine 6—which is preferably used exclusively for increasing the torque during the starting operation and during acceleration operations with high load demands—predominantly or exclusively is implemented by way of a capacitor arrangement 18 with multilayer capacitors of a high power density, namely so-called supercaps or ultracaps. The capacitor arrangement 18 is either charged by way of the existing (not shown) onboard battery (or starter battery) and/or is charged during the recuperation operation of the hybrid motor vehicle. A sufficient charge condition of the capacitor arrangement 18 can be ensured at most times particularly by a charging by way of the onboard battery.

The coordination of the individual components of the transmission line takes place by means of a control unit 20 or a plurality (not shown) of individual control devices assigned to the individual components.

According to the invention, the transmission unit 10 has at least one additional starting gear position 10c, which can be activated only when defined conditions are present (falling below a defined charge threshold of the energy accumulator 18) and exclusively during a starting operation from the stationary position of the vehicle.

In a particularly preferred embodiment of the invention, a conventional transmission is constructed only with one additional gear position with a correspondingly shorter ratio. However, according to the invention, the additional starting position also may include a front-mounted auxiliary transmission, which is constructed, for example, as a separate component. In this case, the starting gear position 10c integrated in the transmission unit 10 or constructed separately may also be constructed as a continuously variable unit (a so-called CVT transmission).

According to the invention, the control unit 20 is constructed such that, as a function of the charge condition of the energy accumulator 18, the starting operation takes place in a standard gear position of the first ratio or a starting operation takes place in the starting gear position 10c with a ratio of the transmission unit which differs from the first ratio. If the energy accumulator 18 has a charge condition above the defined charge threshold, the starting operation takes place, as in the case of a conventional hybrid motor vehicle, in the standard starting gear position provided for this purpose. If, in contrast, the energy accumulator 18 has a charge condition which is below or equal to the defined charge threshold, the control unit 20 causes the transmission unit 10 to carry out the starting operation using the additional starting gear position according to the invention. This is illustrated in the figure in that the transmission unit 10 is connected with the control unit 20 by way of two broken double arrows.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive unit for a motor vehicle having a hybrid drive, comprising:
    an internal combustion engine;
    an electrical rotating machine having an associated energy accumulator;
    a transmission unit having at least one starting gear position; and
    a control unit operatively configured such that, as a function of a charge condition of the energy accumulator, above a defined charge threshold, the starting operation of the vehicle from a stationary position takes place in a standard gear position and, in an event of a charge condition below the defined charge threshold, the starting operation takes place in the starting gear position, the starting gear position having a shorter ratio than a smallest standard gear position.

2. The drive unit according to claim 1, wherein the electric energy accumulator is constructed as a power capacitor unit.

3. The drive unit according to claim 2, wherein the power capacitor unit is a supercap.

4. The drive unit according to claim 1, wherein the at least one starting gear position is implemented by a unit with a continuously variable transmission ratio arranged in the vehicle in addition to said transmission unit for normal driving operation.

5. A method of controlling a drive unit of a motor vehicle having a hybrid drive, wherein a transmission unit includes at least one starting gear position, the method comprising the acts of:
    determining a charge condition of an energy accumulator of the hybrid drive;
    when the charge condition of the energy accumulator is above a defined charge threshold, performing a starting operation of the vehicle from a stationary position in a standard starting gear position; and
    when the charge condition of the energy accumulator falls below the defined charge threshold, performing the starting operation using the at least one starting gear position, wherein the starting gear position has a shorter ratio than the standard starting gear position.

6. A computer product for a drive unit of a motor vehicle having a hybrid drive and a transmission unit that includes a starting gear position, the computer product comprising a computer readable medium having stored thereon program code segments that:
    determine a charge condition of an energy accumulator of the hybrid drive;
    when the charge condition is above a defined charge threshold, initiates a starting operation of the vehicle from a stationary position in a standard gear position; and
    when the charge condition falls below the defined charge threshold, initiates a starting operation of the vehicle from a stationary position in the starting gear position.

* * * * *